(12) United States Patent
Vanciu et al.

(10) Patent No.: US 12,321,690 B2
(45) Date of Patent: Jun. 3, 2025

(54) DEVICES, SYSTEMS, AND METHODS FOR TRANSCRIPT SANITIZATION

(71) Applicant: Calabrio, Inc., Minneapolis, MN (US)

(72) Inventors: Chris Vanciu, Isle, MN (US); Kyle Smaagard, Forest Lake, MN (US); Boris Chaplin, Medina, MN (US); Dylan Morgan, Minneapolis, MN (US); Paul Gordon, Minneapolis, MN (US); Matt Matsui, Minneapolis, MN (US); Laura Cattaneo, Rochester, MN (US); Catherine Bullock, Minneapolis, MN (US)

(73) Assignee: Calabrio, Inc., Minneapolis, MN (US)

( * ) Notice: Subject to any disclaimer, the term of this patent is extended or adjusted under 35 U.S.C. 154(b) by 0 days.

(21) Appl. No.: 18/320,977

(22) Filed: May 20, 2023

(65) Prior Publication Data

US 2023/0409811 A1    Dec. 21, 2023

Related U.S. Application Data

(60) Provisional application No. 63/344,290, filed on May 20, 2022.

(51) Int. Cl.
| | | |
|---|---|---|
| *G06F 40/166* | (2020.01) | |
| *G06F 40/205* | (2020.01) | |
| *G06F 40/284* | (2020.01) | |
| *G06F 40/30*  | (2020.01) | |

(52) U.S. Cl.
CPC .......... *G06F 40/166* (2020.01); *G06F 40/205* (2020.01); *G06F 40/284* (2020.01); *G06F 40/30* (2020.01)

(58) Field of Classification Search
None
See application file for complete search history.

(56) References Cited

U.S. PATENT DOCUMENTS

2014/0136941 A1 * 5/2014 Avrahami ........... G06F 21/6254
                                                                 715/229
2015/0071542 A1 * 3/2015 Dahl .................... G06V 30/226
                                                                 382/177

(Continued)

OTHER PUBLICATIONS

F. Hassan, et al., "Automatic Anonymization of Textual Documents: Detecting Sensitive Information via Word Embeddings," 2019 18th IEEE International Conference on Trust, Security and Privacy in Computing and Communications, Rotorua, New Zealand, 2019, pp. 358-365 (Year: 2019).*

*Primary Examiner* — Frank D Mills

(57) ABSTRACT

Disclosed herein are computer-implemented devices, systems, and methods of sanitizing a transcript. In an example, such a method includes selecting a transcript to be sanitized, identifying potential redactions to be made in the transcript, and redacting the transcript at the potential redactions to sanitize the transcript. The potential redactions are identifiable via a multi-pass process that includes: generating initial redactions to be made based on surrounding context within the transcript; generating matching redactions to be made based on the initial redactions, and generating character redactions to be made based on at least one of the initial redactions and the matching redactions.

15 Claims, 2 Drawing Sheets

(56) References Cited

U.S. PATENT DOCUMENTS

| | | | |
|---|---|---|---|
| 2015/0089357 A1* | 3/2015 | Vandervort | G06F 21/62 |
| | | | 715/256 |
| 2015/0195406 A1* | 7/2015 | Dwyer | G10L 15/02 |
| | | | 379/265.07 |
| 2015/0378973 A1* | 12/2015 | Korneev | G06F 40/103 |
| | | | 715/256 |
| 2017/0249466 A1* | 8/2017 | Ben-Yair | G06F 21/6254 |
| 2021/0256160 A1* | 8/2021 | Hachey | G06N 20/00 |
| 2022/0292218 A1* | 9/2022 | Zarecki | G06F 40/35 |
| 2023/0096474 A1* | 3/2023 | Krishnan | G06F 16/16 |
| | | | 726/26 |

\* cited by examiner

DEVICES, SYSTEMS, AND METHODS FOR TRANSCRIPT SANITIZATION

CROSS-REFERENCE TO RELATED APPLICATIONS

This application claims priority to U.S. Provisional Application No. 63/344,290, filed May 20, 2022, the entire disclosures of which is hereby incorporated herein by reference.

FIELD OF THE DISCLOSURE

The present invention relates to the field of computer technologies, and particularly, to devices, systems, and methods for intelligent transcript sanitization.

BACKGROUND

Contact centers are staffed with agents to handle customer interactions. Vast amounts of interactions between customers and agents at a contract center occur daily, increasing exponentially when considering larger periods of time. These interactions are often recorded in recordings such as audio files and corresponding transcripts. These recordings and transcripts often contain sensitive information. In certain cases, preventing non-authorized users from obtaining sensitive information from both audio and the corresponding transcript of the audio is a consideration for the contact centers.

SUMMARY

A system of one or more computers can be configured to perform particular operations or actions by virtue of having software, firmware, hardware, or a combination of them installed on the system that in operation causes or cause the system to perform the actions. One or more computer programs can be configured to perform particular operations or actions by virtue of including instructions that, when executed by data processing apparatus, cause the apparatus to perform the actions. One general aspect includes a method of sanitizing a transcript. The method also includes selecting a transcript to be sanitized, identifying potential redactions to be made in the transcript, the potential redactions being identifiable via a multi-pass process that includes: generating initial redactions to be made based on surrounding context within the transcript; and generating matching redactions to be made based on the initial redactions. The method also includes redacting the transcript at the potential redactions to sanitize the transcript. Other embodiments of this aspect include corresponding computer systems, apparatus, and computer programs recorded on one or more computer storage devices, each configured to perform the actions of the methods.

Implementations may include one or more of the following features. The method where the multi-pass process further includes generating character redactions to be made based on at least one of the initial redactions and the matching redactions. The character redactions are generated based on character spacing relative to the at least one of the initial redactions and the matching redactions. The character redactions are iteratively made for like characters proceeding the at least one of the initial redactions and the matching redactions. The machine-learning model is a transformer-based neural network. The surrounding context is determined using a machine-learning model. Redacting the transcript at the potential redactions to sanitize the transcript includes replacing characters in the potential redactions with at least one tag that is selected from a group may include of unique tags and generic tags, the unique tags being such that the tags are replaceable with fictionally may include data in the potential redactions and the generic tags being such that the tags are not replaceable with fictionally may include data in the potential redactions. The potential redactions may include a group of associated potential redactions, and where the at least one tag indicates the group of associated potential redactions. Redacting the transcript at the potential redactions to sanitize the transcript further includes parsing the transcript to provide the transcript in a filterable format based on the tags such that the transcript is filterable for one or more data types. Redacting the transcript at the potential redactions to sanitize the transcript further includes redacting the transcript at filtered portions of the transcript. Redacting the transcript at the potential redactions to sanitize the transcript further includes redacting surrounding context to the filtered portion. Implementations of the described techniques may include hardware, a method or process, or computer software on a computer-accessible medium.

One general aspect includes a data processing system for intelligently sanitizing a transcript. The data processing system also includes an input module that is configured to receive a transcript that is to be sanitized; an identification module that is configured to identify potential redactions to be made in the transcript, the potential redactions being identifiable via a multi-pass process that includes: generating initial redactions to be made based on surrounding context within the transcript; and generating matching redactions to be made based on the initial redactions. The system also includes a processing module that is configured to sanitize the transcript by redacting the transcript at the potential redactions. Other embodiments of this aspect include corresponding computer systems, apparatus, and computer programs recorded on one or more computer storage devices, each configured to perform the actions of the methods.

Implementations may include one or more of the following features. The data processing system where the multi-pass process further includes generating character redactions to be made based on at least one of the initial redactions and the matching redactions, where the character redactions are generated based on character spacing relative to the at least one of the initial redactions and the matching redactions, and where the character redactions are iteratively made for like characters proceeding the at least one of the initial redactions and the matching redactions. Redacting the transcript at the potential redactions to sanitize the transcript includes replacing characters in the potential redactions with at least one tag that is selected from a group may include of unique tags and generic tags, the unique tags being such that the tags are replaceable with fictionally may include data in the potential redactions and the generic tags being such that the tags are not replaceable with fictionally may include data in the potential redactions. The potential redactions may include a group of associated potential redactions, where the at least one tag indicates the group of associated potential redactions, and where redacting the transcript at the potential redactions to sanitize the transcript further includes parsing the transcript to provide the transcript in a filterable format based on the tags such that the transcript is filterable for one or more data types. Redacting the transcript at the potential redactions to sanitize the transcript further includes at least one of redacting the transcript at filtered portions of the transcript and redacting surrounding context to the filtered portion. Implementations of the described techniques may include hardware, a method or process, or computer software on a computer-accessible medium.

One general aspect includes a non-transitory computer-readable medium that stores instructions that. The non-transitory computer-readable medium also includes select a transcript to be sanitized, identify potential redactions to be made in the transcript, the potential redactions being identifiable via a multi-pass process that includes: generating initial redactions to be made based on surrounding context within the transcript; and generating matching redactions to be made based on the initial redactions. The medium also includes redact the transcript at the potential redactions to sanitize the transcript. Other embodiments of this aspect include corresponding computer systems, apparatus, and computer programs recorded on one or more computer storage devices, each configured to perform the actions of the methods.

Implementations may include one or more of the following features. The non-transitory computer-readable medium where the multi-pass process further includes generating character redactions to be made based on at least one of the initial redactions and the matching redactions, where the character redactions are generated based on character spacing relative to the at least one of the initial redactions and the matching redactions, and where the character redactions are iteratively made for like characters proceeding the at least one of the initial redactions and the matching redactions. Redacting the transcript at the potential redactions to sanitize the transcript includes replacing characters in the potential redactions with at least one tag that is selected from a group may include of unique tags and generic tags, the unique tags being such that the tags are replaceable with fictionally may include data in the potential redactions and the generic tags being such that the tags are not replaceable with fictionally may include data in the potential redactions. The potential redactions may include a group of associated potential redactions, where the at least one tag indicates the group of associated potential redactions, and where redacting the transcript at the potential redactions to sanitize the transcript further includes parsing the transcript to provide the transcript in a filterable format based on the tags such that the transcript is filterable for one or more data types. Implementations of the described techniques may include hardware, a method or process, or computer software on a computer-accessible medium.

Additional features and advantages of the present disclosure will become apparent to those skilled in the art upon consideration of the following detailed description of the illustrative examples exemplifying the disclosure as presently perceived.

BRIEF DESCRIPTION OF THE DRAWINGS

The above-mentioned and other features and advantages of this disclosure, and the manner of obtaining them, will become more apparent, and will be better understood by reference to the following description of the exemplary examples taken in conjunction with the accompanying drawings, wherein.

Figure 1:
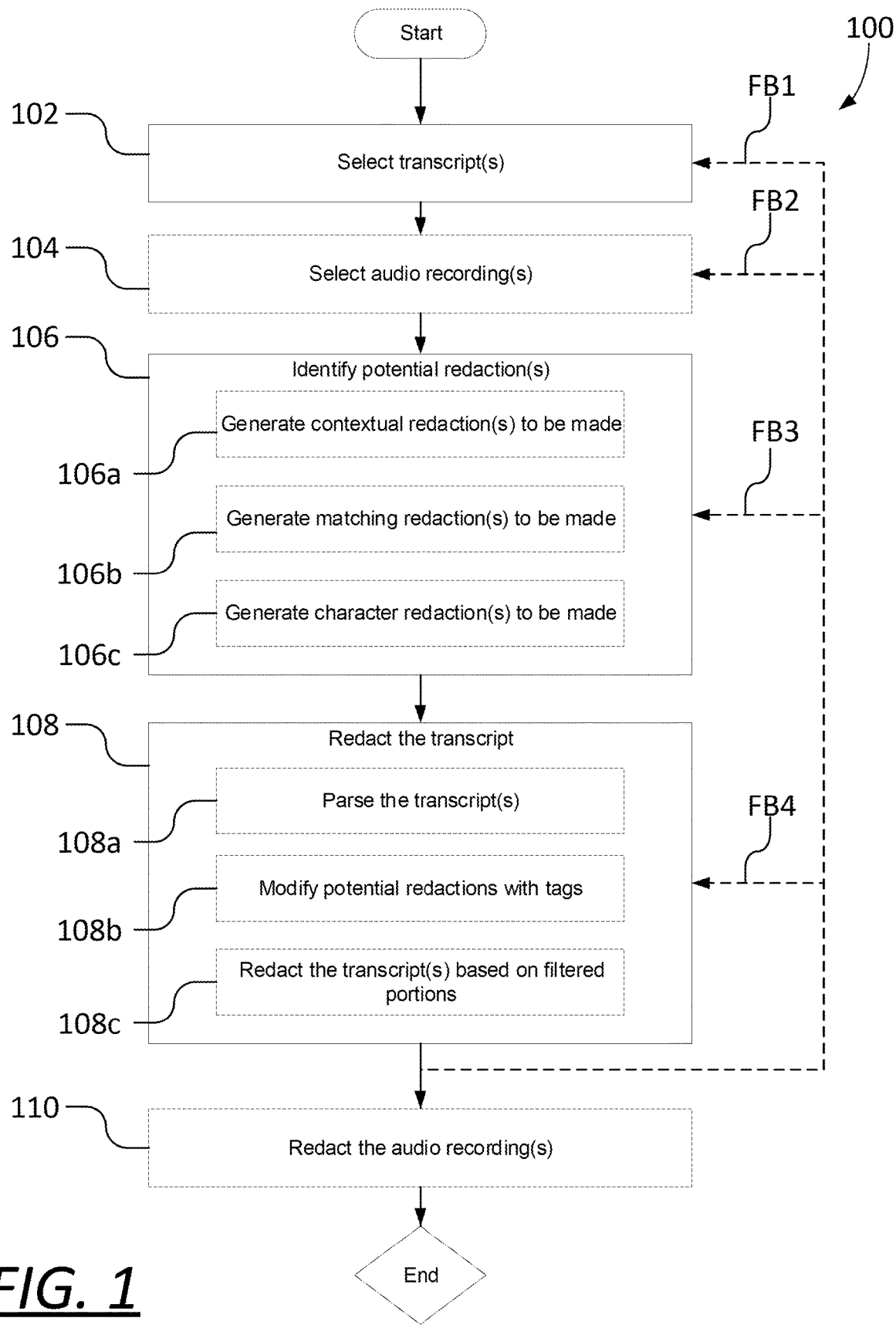
FIG. 1 is a flowchart of a method for sanitizing a transcript, according to principles of the present disclosure.

Corresponding reference characters indicate corresponding parts throughout the several views. Although the drawings represent examples of various features and components according to the present disclosure, the drawings are not necessarily to scale and certain features can be exaggerated in order to better illustrate and explain the present disclosure. The exemplification set out herein illustrates an example of the invention, and such an exemplification is not to be construed as limiting the scope of the invention in any manner.

DETAILED DESCRIPTION OF THE DRAWINGS

For the purposes of promoting an understanding of the principles of the present disclosure, reference is now made to the examples illustrated in the drawings, which are described below. The exemplary examples disclosed herein are not intended to be exhaustive or to limit the disclosure to the precise form disclosed in the following detailed description. Rather, these exemplary examples were chosen and described so that others skilled in the art can utilize their teachings. It is not beyond the scope of this disclosure to have a number (e.g., all) of the features in a given example be used across all examples.

As backdrop, in a typical scenario, call centers create audio recordings of a phone call. These phone calls can include both sensitive information and non-sensitive information. For discussion purposes, sensitive information as used herein can be any information that an entity has deemed undesirable or inappropriate within a conversational recording. Ideally, this information would be removed during audio creation, such as by pausing the recording live when obtaining sensitive information from a customer, such as credit card or social security numbers. Despite even the best efforts, however, there is great difficulty with knowing ahead of time what information should be removed, which leads to the audio recording including some sensitive information. The audio recording is then transcribed into a textual representation (e.g., a transcript of the call) using a transcription engine. As this transcription follows the audio recording, the transcript of the audio would also contain the sensitive information. Under these circumstances, the audio recording will have to be manually inspected. Manual inspection by listening and "clipping" the audio recording manually is a labor-intensive process, and then the audio recording would need to be re-transcribed to provide a transcript also free from sensitive information. The current approach operates against transcripts generated from audio files via a transcription engine.

In general, principles of the present disclosure are useful in removing sensitive information from transcripts generated from an audio recording with the goal of preventing subsequent release of sensitive information contained therein. As used herein, sensitive information is any information that an entity has deemed undesirable or inappropriate within the text. Users determine what is sensitive information based on criteria and/or circumstances regarding potential uses of the sensitive information. Machine-based determinations of sensitive information are also contemplated by this disclosure. In general, a transcript sanitizer is software used to replace sensitive information with redaction information in text-oriented files. In this regard, the present disclosure provides a variety of advantages, such as preventing release of sensitive information, marking areas of redaction such that another process can use the information to redact the audio used to generate this transcript, and marking areas requiring redaction such that another process can use the redacted transcript generated by this process to generate an identical transcript with fictional and consistent information replacing redactions. While this invention's focus is transcript sanitization process, it plays a role in audio sanitization as discussed below.

FIG. 1 is a flowchart of a method 100 for sanitizing a transcript, according to principles of the present disclosure. At issue is the ability to remove sensitive information to prevent non-authorized users from obtaining sensitive information from both audio and the corresponding transcript of the audio. To begin, examples of disclosed transcript sanitization methods require a file containing text that is to be sanitized. Thus, at step 102, a transcript is selected, and optionally, at step 104, a corresponding audio recording is selected. The method 100 can include identifying potential redactions to be made in the transcript at step 106. In this regard, the potential redactions being identifiable via a multi-pass process. This multi-pass process can include generating initial redactions to be made based on surrounding context within the transcript at step 106a, generating matching redactions to be made based on the initial redactions at step 106b, and generating character redactions to be made at step 106c such as those based on at least one of the initial redactions and the matching redactions. The method 100 can include redacting the transcript at the potential redactions to sanitize the transcript at step 108. As discussed further below, this step can include a variety of features.

In more detail, the transcripts used in the method 100 can be text-oriented files, meaning they represent spoken or written language that may be directly read by an individual or through use of electronic means. These transcripts are often displayed on a display device in a manner that can be read by an individual. Implementations of the method 100 use transcript formatted json files, straight text, wrappers, and the like. As described further below, parameters for the method 100 can be set including directory specification of location for non-sanitized transcript files, an output directory, replacement style (e.g., unique or generic), selecting and disabling of specific filters (e.g., names, addresses, emails, numbers, months), prefix specification for output filenames, number of processes to use, log file name, custom filter, and output format (vendor specific or standard format).

Overall, the method 100 can have multiple stages. As discussed herein, there is a first stage where the transcript is prepared for redactions and a second stage where the transcript is redacted. In the first stage, an unsanitized transcript file is provided to a machine learning model, which is a transformer-based neural network. In examples, this transformer based neural network is trained to identify certain text (e.g., named entities, including first, last and middle names) based on the context of the conversation. The transformer can be pretrained using various natural language processing techniques, including programming based on language from various sources. In this regard, the ML model is trained to identify certain text based on context and language structure.

Accuracy of the model can affect accuracy of the sanitization. Properly training the model based on processed transcripts and other data sources can increase the accuracy of the model. Still, transcription errors (e.g., misspellings, grammatical errors, etc.) can compromise the success of the context determination such that it will not be properly identified. In this regard, as described further below, methods disclosed herein can include multiple passes to account for these errors during operation.

Sanitization using the ML model occurs in multiple passes. As discussed herein, there are three passes, the first of which (e.g., the first pass at step 106a) is a context-based pass where indicators are placed based on the context in which the text is found. As discussed further below, these indicators (e.g., replacement or appending symbols such as an asterisk or other special character) replace and/or append the subject text and can be used to develop filters in the second stage. Continuing with the first stage, the second pass at step 106b is a matching pass, where additional indicators are placed based on the text replaced with an indicator in the first pass at step 106a. For instance, transcription errors (e.g., misspellings, errant spaces, etc.) can cause the context of the word to be underappreciated. But if the word is substantially similar to text found and replaced with indicators in the previous pass, they can be replaced with indicators via matching in the second pass. In a further pass (e.g., the third pass at step 106c), indicators for character redactions to be made based on at least one of the previous passes are placed. For instance, indicators from the previous passes (e.g., 106b and/or 106c) can include a variety of text forms (e.g., letters, words, phrases, or other utterances) that may indicate that a subsequent spelling of a word or numbering is ensuing. Some or all of these characters can be replaced with indicators in this pass. Other implementations of the method 100 will have some or all these passes as illustrated, reordered, or even with additional or repeated passes without departing from the scope of this disclosure. Completing these multiple passes can conclude the first stage, at which point the second stage can ensue.

At the second stage, indicators can be used to identify applicable filters and ultimately make redactions in the transcript. Essentially, this stage of the method 100 identifies potentially sensitive information and then looks more specifically at the instances of text to validate whether sensitive information is truly present and where it is located. To start, the transcript can be parsed at step 108a to eventually generate a list of applicable filters and/or identify applicable filters. For instance, the transcript is loaded to generate a text representation (e.g., transformed into a human readable form, similar to paragraphs of text) that is used to apply filters. These filters have associated types of sensitive information that will be redacted based on triggering information (e.g., indicia of whether a text form is sensitive information). Triggering information can include certain words and/or requests for information (e.g., "What is your Social Security Number?"), formatting, or other indicia that sensitive information will be following.

Each filter is executed against each text form to determine which filters are applicable to that portion. If a filter is applicable, it is added to a list of filters to be used against that text form. If no filters are applicable, the next text form is introduced. If one or more filters are applicable to that text form, then for each applicable filter, each word is passed into the filter to locate the triggering information. If triggering information is located (e.g., a suspect portion of a text form has been identified), the replacement portion of the filter is called to replace from the start to the end of the text form that is deemed to be sensitive information for that filter type. Thus, the item to be redacted is identified and is optionally replaced with a tag.

To that end, the transcript undergoes further processing, which can be done in a variety of ways. For instance, the method 100 can (a) generate the text representation of entire transcript, search this large text to determine which filters to use, then generate discrete parts of text and run specific filters to redact information; (b) run all filters on all discrete parts; (c) design filtering to operate against native transcript form and run filtering; or some combination thereof. These are just some examples of many examples that will be apparent to those skilled in the art without an ad nauseum recitation here.

In examples, machine learning text recognition (e.g., natural language processing) models can be combined with a set of software filters, which offer a configurable redaction mechanism to control the redaction replacement style. These features and/or related component can operate independently or together and may be part of a single piece of hardware or multiple discrete pieces of hardware. In addition, redacting with unique consistent identification allows an option to use that information in other ways, such as perhaps differing tone-based category or generating alternate transcripts that are identical to the original information however the sensitive information is fictionalized. Advantageously, this is a programmatic process, rather than the human process required for pausing of audio during gathering of sensitive data or manually post-processing the data to be non-sensitive information.

Regardless of how processing is carried out, after an item is identified by a filter, the item is replaced with a redaction marker. This replacement is made based on the specified replacement style option. As previously noted, the method 100 can include redacting the transcript at the potential redactions to sanitize the transcript at step 108. Redacting the transcript at the potential redactions to sanitize the transcript includes modifying the potential redactions with tags at step 108b. For instance, this step can include replacing characters in the potential redactions with at least one tag that is selected from a group that may include unique tags and generic tags. In examples, the unique tags can be such that the tags are replaceable with fictionally consistent data in the potential redactions, and the generic tags can be such that the tags are not replaceable with fictionally consistent data in the potential redactions. Recall that these parameters may be set at the onset of the method 100 (e.g., during stage one) or optionally some time thereafter. These tags can be categorized and used to form filters with which to filter the transcript for making redactions.

Redacting the transcript at the potential redactions to sanitize the transcript at step 108c can be based on filtered portions of the transcript. For instance, redacting the transcript at the potential redactions at this step can include redacting the transcript at or around filtered portions of the transcript. After an item is identified by a filter, the item is replaced with a redaction marker based on the specified replacement style option. In examples, redacting the transcript at the potential redactions to sanitize the transcript at step 108c further includes redacting surrounding context to the filtered portion. This context can be determined by a machine learning model as discussed elsewhere herein. In addition, filters can have associated context (e.g., preceding or proceeding words, spacing, start and end points at certain characters or character sequences, etc.) that is suggested for redaction. In all replacement styles, when multiple words in series form a single item, the multiple words are combined into a single redaction marker, with start time adjusted to the start time of the first word and end time adjusted to the end time of the last word.

After the transcript text has been processed such that sensitive information has been replaced with redaction markers according to the above process, the file is considered sanitized and written based on the output format specification with redaction segments in place of the redaction markers. The vendor format specification indicates that the originating input format style should be used. If the vendor format specification is not specified, the sanitized file will be written to our specific standard format. Once sanitization completes, the files may then be retrieved from the output directory.

Optionally, the method 100 can include redacting an audio recording at step 110. More details about redacting audio recordings are discussed in U.S. Provisional Patent Application No. 63/289,478, filed Dec. 14, 2021, entitled "DEVICES, SYSTEMS, AND METHODS FOR AUDIO SANITIZATION," the entire contents of which are incorporated herein by reference.

Feedback loops can be incorporated into the method 100. For instance, these feedback loops can indicate iterative processing of a transcript and/or audio file or processing of multiple transcripts and/or audio files. For instance, FB1 can loop back to selecting another transcript after an initial full or partial transcript is processed, and FB2 can loop back to selecting another audio recording after an initial full or partial audio file is processed. In addition, or in alternative, FB3 can indicate an iterative redaction process where potential redactions are identified at step 106 and then redacted at step 108 until no more potential redactions are identified. In addition, or in alternative, FB4 can indicate an iterative redaction process where all potential redactions are identified at step 106 and then looped through in redacting the transcript at step 108 until no more redaction markers are identified. As a further example, FB4 can indicate a process where multiple successive filters are selected (e.g., first names, then addresses, then social security numbers) without need to identify potential redactions again. These are just some examples of many feedback loop examples that are disclosed herein and should not be construed as limiting the scope of this disclosure.

Name Redaction Example

Perhaps best understood within the context of a specific examples, the proceeding discussion will be based on name sanitization as a non-limiting example implementation with continued reference to FIG. 1. This example, however, is just one of many examples disclosed herein. As one skilled in the art would appreciate, there are additional classifications that could be made, including machine learning models made to handle or made exclusively for each classification. The method 100 is carried out by software that functions as a wrapper around the actual processing so that the software can execute against sets of files. The software includes or can otherwise access a transformer model that employs machine learning principles for natural language processing of the transcript as well as other processes discussed elsewhere herein, including the multi-pass process to place indicators within the transcript for redaction. The resulting output of the machine learning model is a name sanitized transcript that has had first, middle and last names removed and redaction information (redaction markers) in place of the first, middle and last names.

With the software, execution can begin by selecting the transcript(s) (or directory containing the set of transcript files) at step 102 and optionally selecting a corresponding audio recording at step 104. If name sanitization has been previously performed, the output files generated by the previous name sanitization process can be used. Next, executing the name sanitization program relies on extracting the straight raw text from the transcript formatted json files. The text forms (e.g., words, sentences, and/or other utterances) are then concatenated into a single string such that the full transcript is condensed into a single string. As discussed in more detail below, this single string is then passed through the transformer model in the first pass, then through a secondary name removal in the second pass, and then through the name spelling removal in the third pass. Parameters can then be set to specify the output directory, replacement style, filter disablement, output file name prefix, number of processes to use, log file, custom category filter phrases, output format and the like. Note that while implementations of the software ingest j son formatted files, the filters (including the machine learning) run against the textual representation indicated by the transcript file and therefore could technically operate against any given set of text.

Stage One

After the transcript is selected at step 102, in the first stage, the transformer model is used to identify first, last, and middle names, for instance. Identifying potential redactions at step 106 via the multi-pass process ensues. This process has three passes: 1) the first pass at step 106a uses the transformer model to identify first, last, and middle names; 2) the second pass at step 106b uses word token matching based on names identified and removed in the first pass to identify additional instances of the names (e.g., identical and/or substantially similar instances); and 3) the third pass at step 106c identifies the spelling out of names by looking for single characters within a certain token distance from names identified and removed in one or more of the previous passes. For instance, the third pass can focus on instances in a sentence being transcribed where the individual said their name and spelled it, such as "My name is Johnson J O H N S O N," "My name is Johnson J-O-H-N-S-O-N," or similar. As noted above, other machine learning processes or those with more or less passes or a different order of these passes can be used.

In more detail, the first pass at step 106a uses a machine-learning model to determine the surrounding context of the text form. Potential redactions (e.g., text forms that are replaceable with indicators and redactable using filters) may include a group of associated potential redactions (e.g., based on the surround context). In this regard, at least one tag indicates the group of associated potential redactions. Certain implementations include machine learning processes that identify instances of requests for information ('What is your Social Security Number') in the first pass as an indicator that sensitive information will be redacted.

The second pass at step 106b searches the transcript (with previously identified names that were replaced or modified with asterisks) for additional mentions of names that were identified and removed in the first pass. Often this step is necessary because of inherent errors in the transcription process. These errors can disrupt the context and structure of the sentence which causes a false negative prediction from the transformer. Due to names being mentioned numerous times in most calls, this second pass is helpful in removing names that were correctly transcribed but were missed by the transformer due to incorrectly transcribed context. If additional mentions on names were identified, as in the first pass, they are replaced by asterisk characters equal to the original length of the name identified.

The third pass at step 106c aims to remove characters of names that are being spelled out. The underlying assumption is that when a speaker first mentions their name, they will immediately begin spelling out their name to accurate interpretation, e.g., "Hi. I'm John (J-O-H-N) Doe (D-O-E)." For every name removed in the first two passes, the eight proceeding tokens are checked to see if they are an alphabetic character. If they are an alphabetic character, they are replaced with an asterisk. If all the eight proceeding tokens to a removed name are single alphabetic characters, the process will continue to replace single alphabetic characters with an asterisk until a token is encountered that is longer than a single character. Then, the process moves onto the next removed name and continues this single alphabetic character check and replace until the end of the transcript.

The method 100 where the multi-pass process further includes generating character redactions to be made at step 106c based on at least one of the initial redactions and the matching redactions. The character redactions are generated based on character spacing relative to the at least one of the initial redactions and the matching redactions. The character redactions are iteratively made for like characters proceeding the at least one of the initial redactions and the matching redactions. After the names are identified, the names are replaced with an indicator (e.g., asterisk characters equal to the original length of the name identified). The names that are identified and are saved in memory and used in the second pass.

Stage Two

The second stage of the process (running in parallel or succession to the first stage) provides the name sanitized transcript to a filter-based portion of the software. This portion of the software identifies sensitive information based on input parameters, including but not limited to text forms indicated on the input parameters (e.g., custom filters), email, street addresses (e.g., number and street names), month names, numbers, and the like. An item of sensitive information may be a single word, or series of words combined to form a single item (e.g., an email address is actually several words). Note that the name sanitization (or sanitization of other categories) may be skipped if name redactions are not desired.

At the conclusion of the first stage, a cleanup process is performed using generic and/or unique tags to modify the potential redactions at step 108b. For instance, if the replacement style setting is for generic tags, this process replaces all names that are replaced with asterisks with a tag of "[Nme]" for characters in replaced names and like nomenclature for other replaces items. In this regard, like items will have the same tag in examples. For specific tags, this process replaces all names that are replaced with asterisks with a tag of "[nme0]" for replaced names and "[nme0_ch0]" for characters in replaced names. In this regard, like items will have a similar tags or identical prefixes or suffixes in examples. For instance, the integers in these tags are incremented such that First Middle Last names will have a replacement of "[nme0] [nme1] [nme2]," keeping the same integer to convey that these three consecutive name replacements belonged to the same person. Additionally, if the person were to spell out their name in the example above, the characters would have a tag of "[nme0_ch0] [nme0_ch1] [nme0_ch2]." If the replacement style setting is for unique tags, the tags will consist of a category plus a unique tag for each item that differs from all other items in that category. For example, if the item being removed is "Steve", it may be replaced as "Nme" if generic is desired or "Nme 1". Therefore, the sentence "Steve bought pizza for Jane. Steve paid $20" becomes "[Nme] bought pizza for [Nme]. [Nme] paid $20" with generic tags or "[Nme1] bought pizza for [Nme2]. [Nme1] paid $20" with unique tags. This may be important if "real" data is desired for future use. If unique tags are used, fictitious data could be inserted (e.g., Nme1 replaced with Bob and Nme2 replaced with Susan).

Redacting the transcript at the potential redactions to sanitize the transcript at step 108 includes parsing the transcript at step 108a to provide the transcript in a filterable format at step. This parsing is based on the tags such that the transcript is filterable for one or more data types. To that end, as noted prior, the transcript undergoes further processing, which can be done in a variety of ways. For instance, the method 100 can (a) generate the text representation of entire transcript, search this large text to determine which filters to use, then generate discrete parts of text and run specific filters to redact information; (b) run all filters on all discrete parts; (c) design filtering to operate against native transcript form and run filtering; or some combination thereof.

As discussed elsewhere herein, in the second stage, the transcript file is transformed into a human readable form. Potentially sensitive information is identified, and its specific instances are validated as sensitive information or not along with its location. Each filter is executed against each text form to determine which filters are applicable to that portion. If a filter is applicable, it is added to a list of filters to be used against that text form. If no filters are applicable, the next text form is introduced. If one or more filters are applicable to that text form, then for each applicable filter, each word is passed into the filter to locate the triggering information. If triggering information is located (e.g., a suspect portion of a text form has been identified), the replacement portion of the filter is called. This portion locates a start and an end of the text form that is deemed to be sensitive information for that filter type. Thus, the item to be redacted is identified and is replaced with a tag at step 108b.

Redacting the transcript at the potential redactions to sanitize the transcript at step 108 includes replacing text forms in the potential redactions with at least one tag that is either a unique tag or a generic tag. Unique tags are such that the tags are replaceable with fictionally consistent data in the potential redactions, and generic tags are such that the tags are not replaceable with fictionally consistent data in the potential redactions. As explained in more detail below, these tags can be categorized and used to form filters with which to filter the transcript for making redactions. When a text form to be redacted is identified, memory is searched to determine if a matching item has already been identified. If the item has previously been identified elsewhere in the document, the replacement category and tag returned will be identical to that of the item stored in memory. However, if the item is not found in memory, the item along with the category and a new tag will be stored in memory and returned as replacement information.

Redacting the transcript at the potential redactions to sanitize the transcript at step 108c can be based on filtered portions of the transcript. For instance, redacting the transcript at the potential redactions can include actually redacting the transcript at filtered portions of the transcript and optionally additional portions based on which filtered portions have been selected for redaction. After an item is identified by a filter, the item is replaced with a redaction marker based on the specified replacement style option. In examples, redacting the transcript at the potential redactions to sanitize the transcript further includes redacting surrounding context to the filtered portion. This context can be determined by a machine learning model as discussed elsewhere herein. In addition, filters can have associated context (e.g., preceding or succeeding words, spacing, start and end points at certain characters or character sequences, etc.) that is suggested for redaction. In all replacement styles, when multiple words in series form a single item, the multiple words may be combined into a single redaction marker, with start time adjusted to the start time of the first word and end time adjusted to the end time of the last word.

After the transcript text has been processed such that sensitive information has been replaced with redaction markers according to the above process, the file is considered sanitized and written based on the output format specification with redaction segments in place of the redaction markers. The vendor format specification indicates that the originating input format style should be used. If the vendor format specification is not specified, the sanitized file will be written to our specific standard format. Once sanitization completes, the files may then be retrieved from the output directory. Optionally, as noted above, the method 100 can include redacting an audio recording at step 110 as discussed elsewhere herein.

Other examples of this aspect of the present disclosure include corresponding computer systems, apparatus, and computer programs and/or instructions recorded on one or more computer storage devices, each configured to perform the actions of the methods. In this regard, these examples can be similar to those methods discussed elsewhere herein and thus include some (e.g., all or some subset) of the features discussed above.

Figure 2:
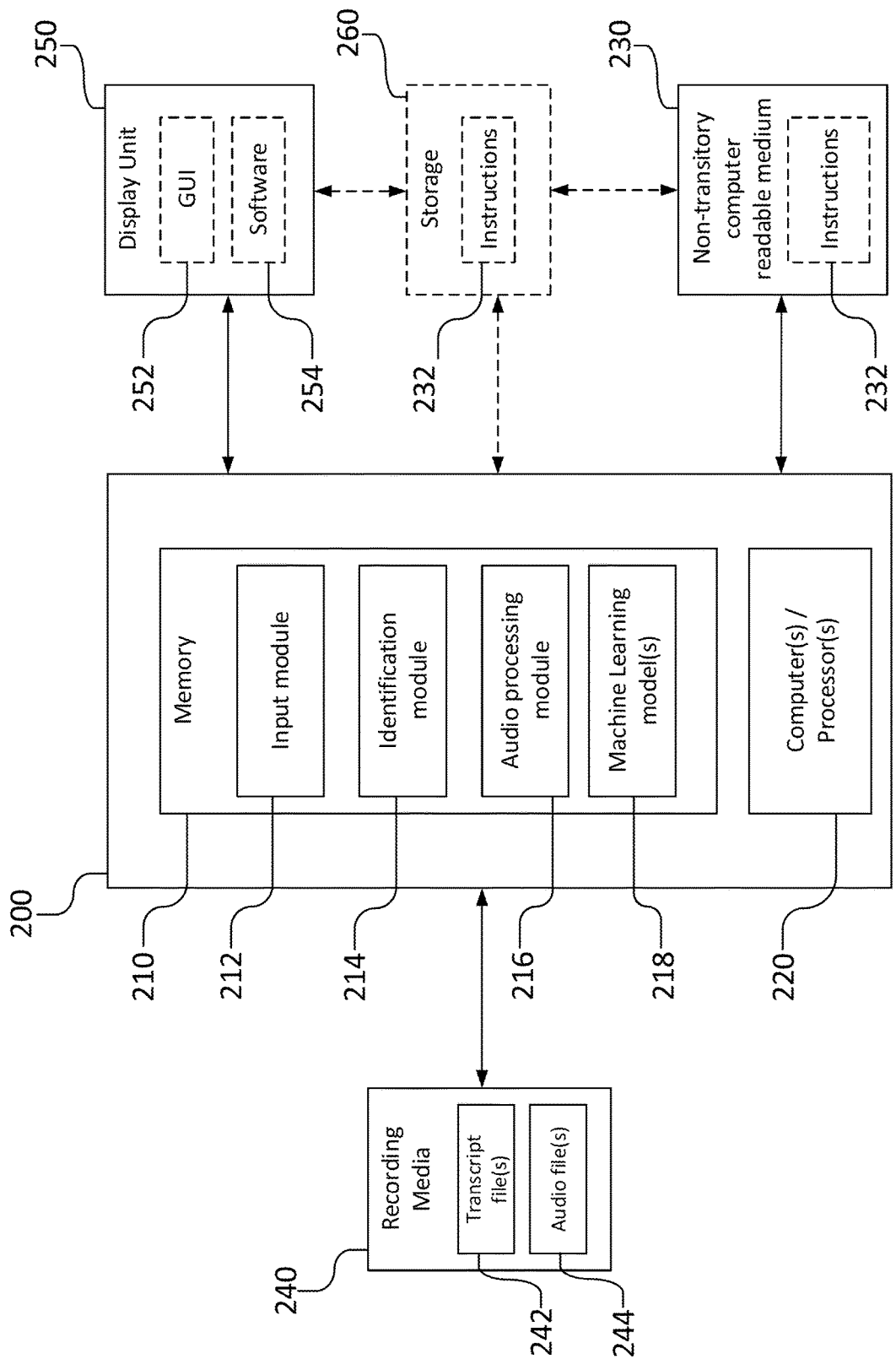
FIG. 2 is a block diagram schematic representation of a data processing system, according to principles of the present disclosure.

As an example, as shown in FIG. 2, the present disclosure includes data processing systems 200 for intelligently sanitizing transcripts. FIG. 2 shows a block diagram schematic representation of a data processing system, according to principles of the present disclosure. These systems include hardware that can operate independently in some examples or together in other examples and may be part of a single piece of hardware or multiple discrete pieces of hardware. For example, such a data processing system 200 can include a memory 210 for storing one or more modules (e.g., an input module 212, an identification module 214, and a processing module 216) and a machine learning model 218. The machine learning module can be employed to improve performance of any of the modules or functions discussed herein. In addition, or in alternative, the data processing system 200 can include a processor 220 or a computer 220 configured to access the memory 210. In this regard, exemplary procedures in accordance with the present disclosure described herein can be performed by a processing arrangement (e.g., one or more processors 220), a computing arrangement (e.g., one or more computers 220), or both. Such arrangements can be, e.g., entirely or a part of, or include, but not limited to, a computer 220, a processor 220, or both, each of which can include, e.g., one or more processors 220 (e.g., CPUs or microprocessors), and use a non-transitory computer-readable medium 230 (e.g., RAM, ROM, hard drive, or other storage device) with instructions 232 stored thereon. Instructions 232, among other things, can be stored on a storage 260 (e.g., HDD, SSD, etc.) that is in communication with the data processing system 200. In examples, the data processing system 200 can be a server running a private cloud platform or a multi-tenant platform.

The processor 220 can be in communication with a display unit 250. According to some examples of the present disclosure, the display unit 250 can be a monitor or touchscreen configured to input information to the processor 220 in addition to outputting information from the processor 220. In examples, the display unit 250 is configured to present aspects of the software 254 for input, such as selecting transcript files 242 or audio files 244, displaying the processed transcript, redaction list, etc. As such, the display unit 250 can include a graphic user interface 252 (GUI 252) and a software 254 as discussed elsewhere herein.

User interaction with the software 254 or the model 218 can be facilitated via the display unit 250. For example, the display unit 250 can include software 254 in communication with the server and the GUI 252 with which to prompt a user and receive a user input (e.g., an analog or digital input). In examples, the display unit 250 is configured to optionally allow for user input to confirm or modify the inputs and results from the processor 220, modify criteria (e.g., filters, run parameters, etc.) used by the processor 220, or trigger subsequent runs of the model 218. Of course, in other examples, the display unit 250 can be configured to allow any combination of these functions and more as these functions are just some of many examples one skilled in the art would appreciate.

Various procedures, at least some of which are similar to those in the previously discussed methods, are performed by the processor 220 in some examples. The data processing system 200 includes an input module 212 that is configured to receive a transcript that is to be sanitized; an identification module 214 that is configured to identify potential redactions to be made in the transcript, and a processing module 216 that is configured to sanitize the transcript by redacting the transcript at the potential redactions. The potential redactions are identifiable via a multi-pass process that includes: generating initial redactions to be made based on surrounding context within the transcript; and generating matching redactions to be made based on the initial redactions; and generating character redactions to be made based on at least one of the initial redactions and the matching redactions.

Implementations of the data processing system 200 may include one or more of the following features, as was the case with the methods discussed herein. For instance, the character redactions are generated based on character spacing relative to the at least one of the initial redactions and the matching redactions, and the character redactions are iteratively made for like characters proceeding the at least one of the initial redactions and the matching redactions.

In addition, or in alternative, redacting the transcript at the potential redactions to sanitize the transcript includes replacing characters in the potential redactions with at least one tag that is selected from a group may include of unique tags and non-unique tags. The unique tags are such that the tags are replaceable with fictionally consistent data in the potential redactions, and the non-unique tags are such that the tags are not replaceable with fictionally consistent data in the potential redactions.

In addition, or in alternative, the potential redactions may include a group of associated potential redactions, where at least one tag indicates the group of associated potential redactions. In examples, redacting the transcript at the potential redactions to sanitize the transcript further includes parsing the transcript to provide the transcript in a filterable format based on the tags such that the transcript is filterable for one or more data types. In examples, redacting the transcript at the potential redactions to sanitize the transcript further includes at least one of redacting the transcript at filtered portions of the transcript and redacting surrounding context to the filtered portion.

With continued reference to FIG. 2, a non-transitory computer-readable medium 230 is also included in the present disclosure. The non-transitory computer-readable medium 230 can store instructions 232 that, when executed by one or more processors 220, can cause the one or more processors 220 to perform one or more functions. These functions can be similar to steps discussed in the aforementioned methods. For instance, the instructions 232 can cause the one or more processors 220 to perform one or more of the following tasks: select a transcript to be sanitized, identify potential redactions to be made in the transcript, and redact the transcript at the potential redactions to sanitize the transcript. The potential redactions being identifiable via a multi-pass process that includes: generating initial redactions to be made based on surrounding context within the transcript; generating matching redactions to be made based on the initial redactions; and generating matching redactions to be made based on the initial redactions; and generating character redactions to be made based on at least one of the initial redactions and the matching redactions.

Implementations of the non-transitory computer-readable medium may include one or more of the following features, as was the case with the methods and systems discussed herein. For instance, the character redactions are generated based on character spacing relative to the at least one of the initial redactions and the matching redactions, and the character redactions are iteratively made for like characters proceeding the at least one of the initial redactions and the matching redactions.

In addition, or in alternative, redacting the transcript at the potential redactions to sanitize the transcript includes replacing characters in the potential redactions with at least one tag that is selected from a group may include of unique tags and non-unique tags. The unique tags are such that the tags are replaceable with fictionally consistent data in the potential redactions, and the non-unique tags are such that the tags are not replaceable with fictionally consistent data in the potential redactions.

In addition, or in alternative, the potential redactions may include a group of associated potential redactions, where the at least one tag indicates the group of associated potential redactions. In examples, redacting the transcript at the potential redactions to sanitize the transcript further includes parsing the transcript to provide the transcript in a filterable format based on the tags such that the transcript is filterable for one or more data types. In examples, redacting the transcript at the potential redactions to sanitize the transcript further includes at least one of redacting the transcript at filtered portions of the transcript and redacting surrounding context to the filtered portion.

While the present disclosure has been described as having an exemplary design, the present invention can be further modified within the spirit and scope of this disclosure. This application is therefore intended to cover any variations, uses, or adaptations of the invention using its general principles. Further, this application is intended to cover such departures from the present disclosure as come within known or customary practices in the art to which this invention pertains. Some general principles with which to interpret this disclosure are provided below.

As used herein, the modifier "about" used in connection with a quantity is inclusive of the stated value and has the meaning dictated by the context (for example, it includes at least the degree of error associated with the measurement of the particular quantity). When used in context of a range, the modifier "about" should also be considered as disclosing the range defined by the absolute values of the two endpoints. For example, the range "from about 2 to about 4" also disclosed the range "from 2 to 4."

It is well understood that methods that include one or more steps, the order listed is not a limitation of the claim unless there are explicit or implicit statements to the contrary in the specification or claim itself. It is also well settled that the illustrated methods are just some examples of many examples disclosed, and certain steps can be added or omitted without departing from the scope of this disclosure. Such steps can include incorporating devices, systems, or methods or components thereof as well as what is well understood, routine, and conventional in the art.

The connecting lines shown in the various figures contained herein are intended to represent exemplary functional relationships and/or physical couplings between the various elements. It should be noted that many alternative or additional functional relationships or physical connections can be present in a practical system. However, the benefits, advantages, solutions to problems, and any elements that can cause any benefit, advantage, or solution to occur or become more pronounced are not to be construed as critical, required, or essential features or elements. The scope is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone can be present in an example, B alone can be present in an example, C alone can be present in an example, or that any combination of the elements A, B or C can be present in a single example; for example, A and B, A and C, B and C, or A and B and C.

In the detailed description herein, references to "one example," "an example," "an exemplary example," etc., indicate that the example described can include a particular feature, structure, or characteristic, but every example can not necessarily include the particular feature, structure, or characteristic. Moreover, such phrases are not necessarily referring to the same example. Further, when a particular feature, structure, or characteristic is described in connection with an example, it is submitted that it is within the knowledge of one skilled in the art with the benefit of the present disclosure to affect such feature, structure, or characteristic in connection with other examples whether or not explicitly described. After reading the description, it will be apparent to one skilled in the relevant art(s) how to implement the disclosure in alternative examples.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises," "comprising," or any other variation thereof, are intended to cover a non-exclusive inclusion, such that a process, method, article, or apparatus that comprises a list of elements does not include only those elements but can include other elements not expressly listed or inherent to such process, method, article, or apparatus.

What is claimed is:

1. A method of sanitizing a transcript, the method comprising:
    selecting a transcript to be sanitized;
    extracting a plurality of text items from the transcript;
    condensing the transcript into a single string by concatenating the plurality of text items;
    identifying potential redactions to be made in the transcript, the potential redactions being identifiable via a multi-pass process that includes:
        generating initial redactions to be made based on surrounding context within the transcript, wherein the surrounding context is determined using a transformer-based machine learning model operating on the single string, and wherein the transformer-based machine learning model is trained using one or more natural language processing techniques to identify certain text based upon context and language structure; and
        generating matching redactions to be made based on the initial redactions, wherein the matching redactions are determined by identifying single characters within a predetermined token distance from the initial redactions;
    redacting the transcript at the potential redactions to sanitize the transcript, wherein redacting the transcript at the potential redactions to sanitize the transcript includes replacing characters in the potential redactions with at least one tag that is selected from a group consisting of:
        unique tags, the unique tags being such that the tags are replaceable with fictionally consistent data in the potential redactions, wherein a unique tag comprises a category plus a unique identifier; and
        generic tags, the generic tags being such that the tags are not replaceable with fictionally consistent data in the potential redactions; and
    converting the redacted transcript to a specified vendor format.

2. The method of claim 1, wherein the multi-pass process further includes generating character redactions to be made based on at least one of the initial redactions and the matching redactions.

3. The method of claim 2, wherein the character redactions are generated based on character spacing relative to the at least one of the initial redactions and the matching redactions.

4. The method of claim 3, wherein the character redactions are iteratively made for like characters proceeding the at least one of the initial redactions and the matching redactions.

5. The method of claim 1, wherein the potential redactions comprise a group of associated potential redactions, and wherein the at least one tag indicates the group of associated potential redactions.

6. The method of claim 1, wherein redacting the transcript at the potential redactions to sanitize the transcript further includes parsing the transcript to provide the transcript in a filterable format based on the tags such that the transcript is filterable for one or more data types.

7. The method of claim 6, wherein redacting the transcript at the potential redactions to sanitize the transcript further includes redacting the transcript at filtered portions of the transcript.

8. The method of claim 7, wherein redacting the transcript at the potential redactions to sanitize the transcript further includes redacting surrounding context to the filtered portion.

9. A data processing system for intelligently sanitizing a transcript, the data processing system comprising at least one processor and memory comprising computer executable instructions that, when executed by the at least one processor, cause the at least one processor to perform operations comprising:
    receive a transcript that is to be sanitized;
    extract a plurality of text items from the transcript;
    condense the transcript into a single string by concatenating the plurality of text items;
    identify potential redactions to be made in the transcript, the potential redactions being identifiable via a multi-pass process that comprises:
        generating initial redactions to be made based on surrounding context within the transcript, wherein the surrounding context is determined using a transformer-based machine learning model operating on the single string, and wherein the transformer-based machine learning model is trained using one or more natural language processing techniques to identify certain text based upon context and language structure; and generating matching redactions to be made based on the initial redactions, wherein the matching redactions are determined by identifying single characters within a predetermined token distance from the initial redactions;

sanitize the transcript by redacting the transcript at the potential redactions, wherein redacting the transcript at the potential redactions to sanitize the transcript comprises replacing characters in the potential redactions with at least one tag that is selected from a group consisting of:

unique tags, the unique tags being such that the tags are replaceable with fictionally consistent data in the potential redactions, wherein a unique tag comprises a category plus a unique identifier; and generic tags, the generic tags being such that the tags are not replaceable with fictionally consistent data in the potential redactions; and convert the redacted transcript to a specified vendor format.

10. The data processing system of claim 9, wherein the multi-pass process further includes generating character redactions to be made based on at least one of the initial redactions and the matching redactions, wherein the character redactions are generated based on character spacing relative to the at least one of the initial redactions and the matching redactions, and wherein the character redactions are iteratively made for like characters proceeding the at least one of the initial redactions and the matching redactions.

11. The data processing system of claim 9, wherein the potential redactions comprise a group of associated potential redactions, wherein the at least one tag indicates the group of associated potential redactions, and wherein redacting the transcript at the potential redactions to sanitize the transcript further includes parsing the transcript to provide the transcript in a filterable format based on the tags such that the transcript is filterable for one or more data types.

12. The data processing system of claim 11, wherein redacting the transcript at the potential redactions to sanitize the transcript further includes at least one of redacting the transcript at filtered portions of the transcript and redacting surrounding context to the filtered portion.

13. A non-transitory computer-readable medium that stores instructions that, when executed by one or more processors, cause the one or more processors to:

select a transcript to be sanitized;

extract a plurality of text items from the transcript;

condense the transcript into a single string by concatenating the plurality of text items;

identify potential redactions to be made in the transcript, the potential redactions being identifiable via a multi-pass process that includes:

generating initial redactions to be made based on surrounding context within the transcript, wherein the surrounding context is determined using a transformer-based machine learning model operating on the single string, and wherein the transformer-based machine learning model is trained using one or more natural language processing techniques to identify certain text based upon context and language structure; and generating matching redactions to be made based on the initial redactions, wherein the matching redactions are determined by identifying single characters within a predetermined token distance from the initial redactions;

redact the transcript at the potential redactions to sanitize the transcript, wherein redacting the transcript at the potential redactions to sanitize the transcript includes replacing characters in the potential redactions with at least one tag that is selected from a group consisting of:

unique tags, the unique tags being such that the tags are replaceable with fictionally consistent data in the potential redactions, wherein a unique tag comprises a category plus a unique identifier; and generic tags, the generic tags being such that the tags are not replaceable with fictionally consistent data in the potential redactions; and converting the redacted transcript to a specified vendor format.

14. The non-transitory computer-readable medium of claim 13, wherein the multi-pass process further includes generating character redactions to be made based on at least one of the initial redactions and the matching redactions, wherein the character redactions are generated based on character spacing relative to the at least one of the initial redactions and the matching redactions, and wherein the character redactions are iteratively made for like characters proceeding the at least one of the initial redactions and the matching redactions.

15. The non-transitory computer-readable medium of claim 13, wherein the potential redactions comprise a group of associated potential redactions, wherein the at least one tag indicates the group of associated potential redactions, and wherein redacting the transcript at the potential redactions to sanitize the transcript further includes parsing the transcript to provide the transcript in a filterable format based on the tags such that the transcript is filterable for one or more data types.

* * * * *